March 17, 1959 IWAJIRO MARUYAMA 2,877,803

HEALD FRAME

Filed Dec. 26, 1956 5 Sheets-Sheet 1

INVENTOR.
I. MARUYAMA
BY
Wenderoth, Lind & Ponack
Attys.

March 17, 1959 IWAJIRO MARUYAMA 2,877,803

HEALD FRAME

Filed Dec. 26, 1956 5 Sheets-Sheet 2

INVENTOR.
I. MARUYAMA
BY
Wenderoth, Lind & Ponack
Attys.

March 17, 1959 IWAJIRO MARUYAMA 2,877,803

HEALD FRAME

Filed Dec. 26, 1956 5 Sheets-Sheet 3

INVENTOR.
I. MARUYAMA
BY

Wenderoth, Lind & Ponack
Attys.

March 17, 1959 IWAJIRO MARUYAMA 2,877,803

HEALD FRAME

Filed Dec. 26, 1956 5 Sheets-Sheet 4

INVENTOR.
I. MARUYAMA
BY
Wenderoth, Lind & Ponack
Attys.

March 17, 1959 IWAJIRO MARUYAMA 2,877,803

HEALD FRAME

Filed Dec. 26, 1956 5 Sheets-Sheet 5

INVENTOR.
I. MARUYAMA
BY
Wenderoth, Lind & Ponack
Attys.

United States Patent Office 2,877,803

Patented Mar. 17, 1959

2,877,803

HEALD FRAME

Iwajiro Maruyama, Nakano-cho, Sakai, Japan

Application December 26, 1956, Serial No. 630,593

Claims priority, application Japan February 3, 1956

7 Claims. (Cl. 139—92)

The present invention relates to a harness frame for looms of an entirely new type, having for its object the replacement of such frames in a simple and easy manner within a short space of time. The harness frame of the present invention consists of an outer frame to be permanently fixed to the loom, an inner frame for supporting heddles, and means for replacing said inner frame when desired.

The warp tying operation has hitherto been performed upon the loom each time a looming operation is started anew in order to avoid the waste of time and labor required for readjusting the position of the newly installed harness. Even when the most advanced portable automatic tying machine is employed, however, it takes about 100 minutes to tie 6,000 threads at the rate of one second per thread on the average, and an hour and a half or thereabouts for setting, adjusting and removing the tying machine. The weaving operation must thus be suspended for several hours altogether, impairing to a great extent the entire weaving capacity. Excepting specific cases, therefore, the drawing-in and warp-tying operations are usually accomplished prior to the looming operation. In this case too, the waste of time and labor required for readjusting the position of the replaced harness each time as the warp beams are set anew is inevitable, insofar as the ordinary harness hitherto in use is employed. In other words, since the harness must be replaced in its entirety with a new one whenever a series of warp beams are used up, the position of the new harness must be readjusted each time the looming operation is started anew, requiring a great deal of skilled labor and time due to structural inconveniences more or less inherent in the frames and other parts of the harness. In addition, a great number of harness frames must be provided for as reserves.

According to the present invention, the operation required for renewing the used-up beams with new ones consists, once the position of the harness is fixed at the beginning of the weaving operation, merely in removing the inner frame which are stretched thereacross parallel heddles and installing a new frame of the same type by turning a pair of levers attached to the outer frame which is permanently fixed to the loom. When the outer frame which is most liable to undergo distortion is built strong enough to resist any possible distortions and is permanently fixed to the loom at the proper place, the initial position of the harness remains constant, requiring no further readjustments, however often the looming operation may be started anew, that is, however frequently the inner frame may be replaced, since the outer frame is so contrived as to hold tightly therein the inner frame with parallel heddles stretched thereacross by means of a pair of levers attached to the outer frame.

The present invention is thus characterized by the elimination of the waste of time and highly skilled labor required for readjusting the position of the new harness, enabling even unskilled workers to perform the looming operation in a simple and easy manner within a limited space of time, by a reduction in the personnel required for looming to a minimum, and by the possibility of not only improving the weaving capacity to a great extent but also obtaining a fabric with a uniform pattern on a more economical basis than ever before.

Another characteristic feature of the present invention is that the dislocation of the harness and the friction between various parts of the harness, usually caused by the mechanical shocks taking place in the course of the weaving operation, are entirely eliminated, thereby improving the durability of the harness, because the harness frame of the present invention consists separately, as stated before, of an inner frame and an outer frame, and the inner frame is held tightly within the outer frame by means of a pair of levers attached to the outer frame.

The harness frame of the present invention comprises various devices relating in particular to the mechanism for holding the inner frame tightly within the outer frame and permitting easy release of the former from the latter as the case may be, and relating to the structure of the inner frame itself, one embodiment thereof consisting of top and bottom heddle supporting bars and end struts, each of which bars is connected in position at each end by end struts, and the other embodiment consisting of top and bottom frame rails, top and bottom heddle supporting bars and end struts, each of which frame rails and heddle supporting bars is connected in position at each end by end struts.

In order that the present invention may be readily and clearly understood, the harness frame of the present invention is illustrated by way of example in the accompanying drawings, in which Figures 1 to 20 show an embodiment in which the harness frame consists of top and bottom heddle supporting bars and end struts and Figs. 21–24 show an embodiment in which the harness frame consists of top and bottom frame rails, top and bottom heddle supporting bars and end struts.

Figure 12:
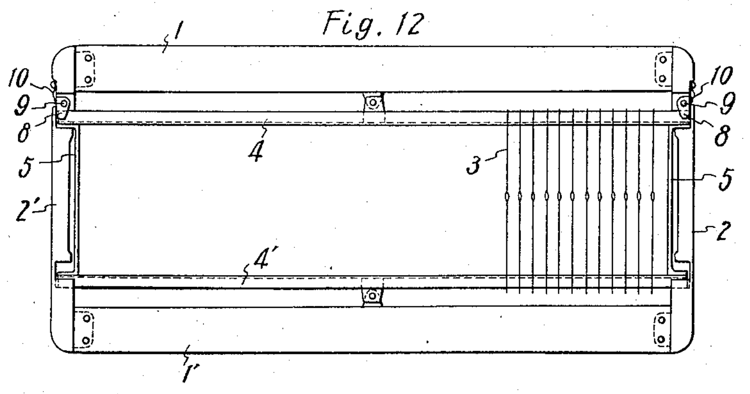
Figure 12 is a front view of another example of the harness frame shown in Figure 1.
Figure 13:
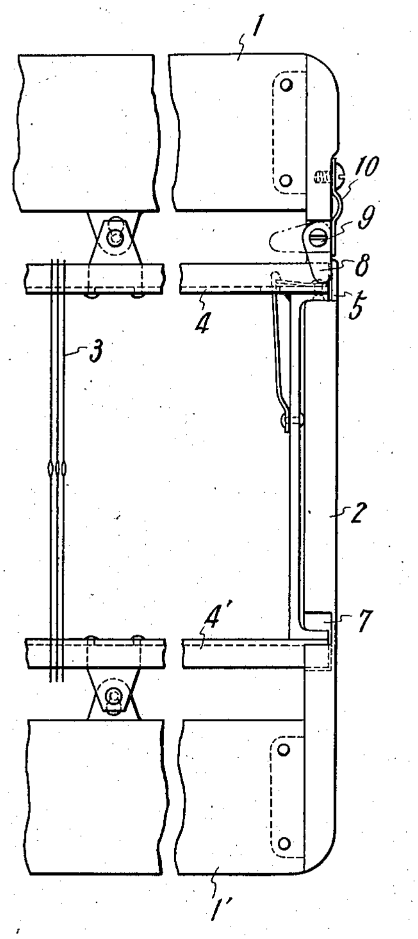
Figure 13 is an enlarged front view of the middle and right parts of the harness frame shown in Figure 12.
Figure 14:
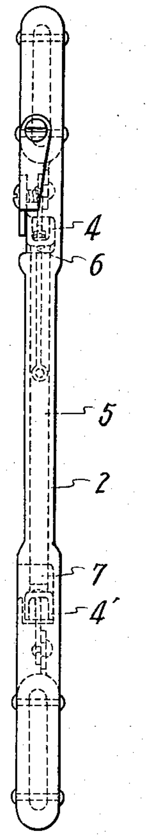
Figure 14 is a side elevation of Figure 13.
Figures 15A, 15B, 15C:
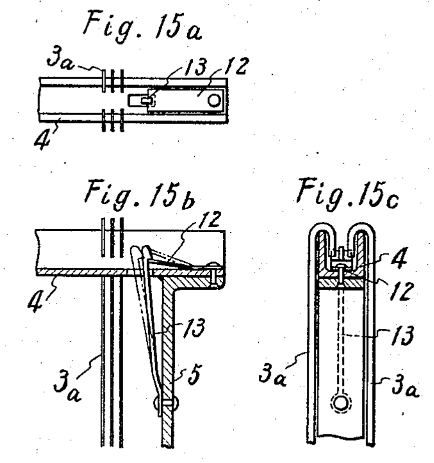

Figures 15*a*, *b* and *c* are detailed drawings of the right portion of the top heddle supporting bar of the inner frame shown in Figure 12.

Figures 16A, 16B, 16C:
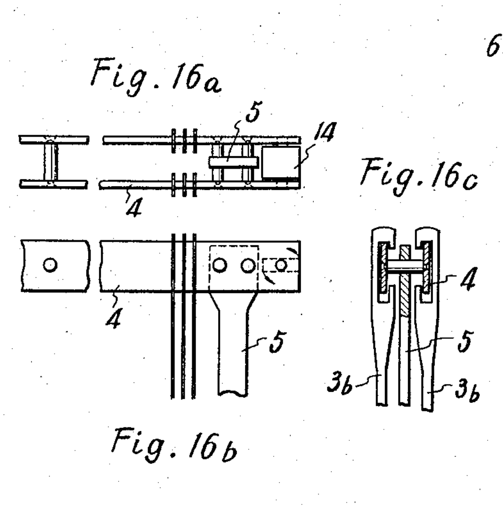

Figures 16*a*, *b* and *c*, and 17*a*, *b* and *c* are detailed drawings of the right portion of another example of the top heddle supporting bar of the inner frame shown in Figure 12.

Figures 17A, 17B, 17C:
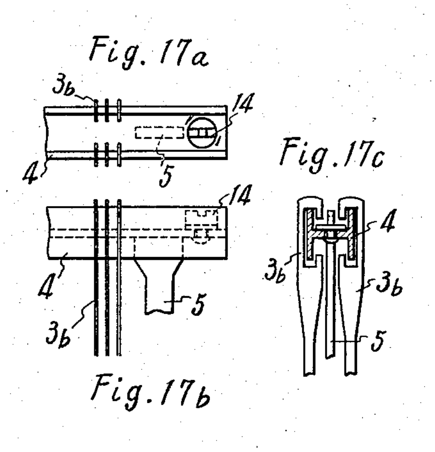
Figure 18:
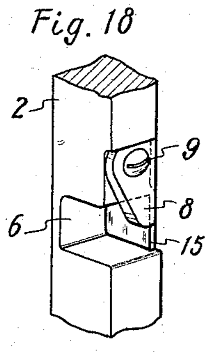

Figure 18 is an enlarged oblique elevation of latching means for holding the top heddle supporting bar of the inner frame shown in Figures 12 to 17.

Figure 19:
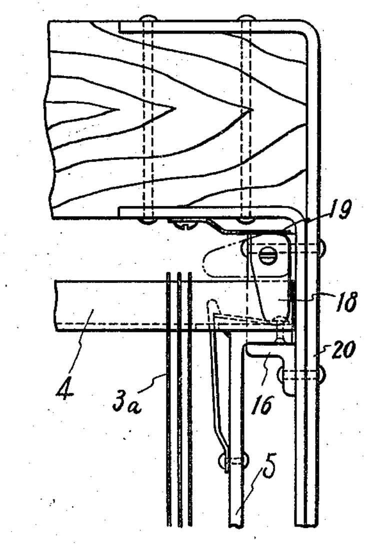

Figure 19 is a partial front view showing an example of the present invention applied to the ordinary harness frame.

Figure 20:
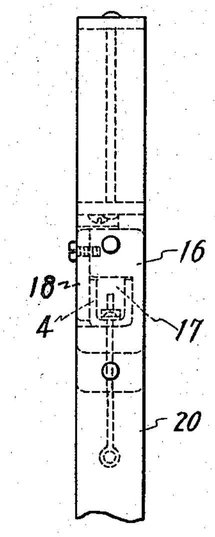

Figure 20 is a side elevation of Figure 19.

Figure 21:
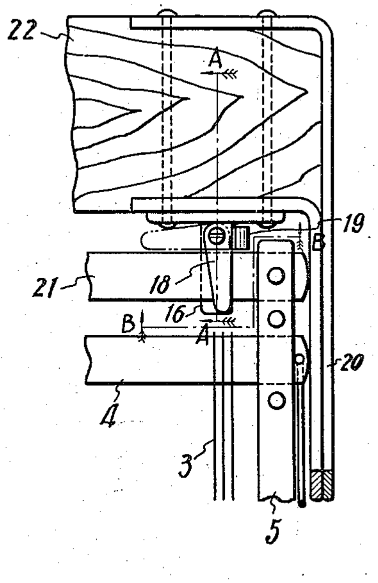

Figure 21 is a partial front view showing another example of the application of the present invention.

Figures 22, 23, 24, 25:
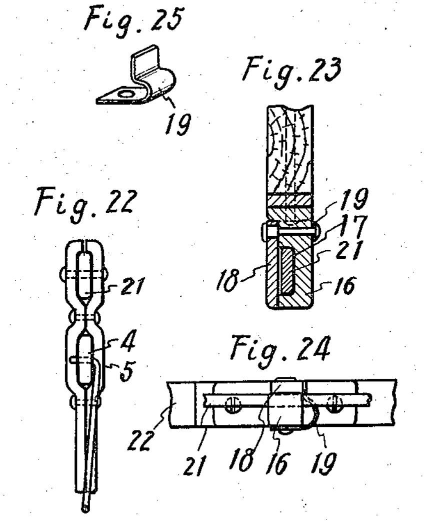

Figure 22 is a side elevation of the end strut of the inner frame shown in Figure 21.

Figure 23 is a sectional view taken on the line A—A of Figure 21.

Figure 24 is an upward view taken on the line B—B of Figure 21.

Figure 25 is an oblique view of the metal plate spring shown in Figure 21.

Similar reference characters indicate corresponding parts throughout these drawings.

Figure 1:
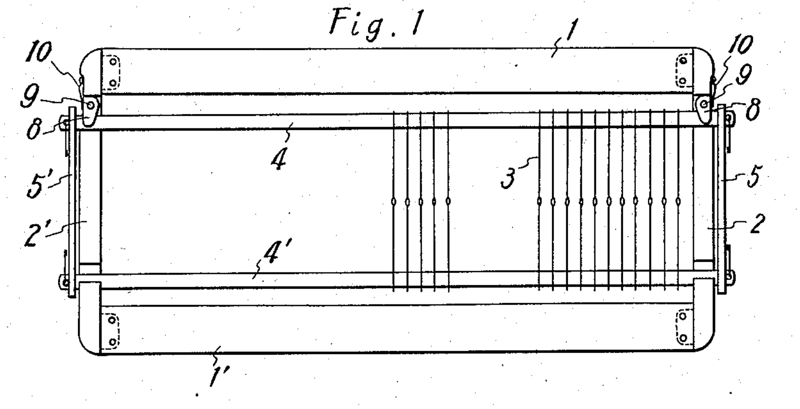
Figure 1 is a front view of one embodiment of the harness frame of the present invention comprising an inner frame and an outer frame.
Figure 2:
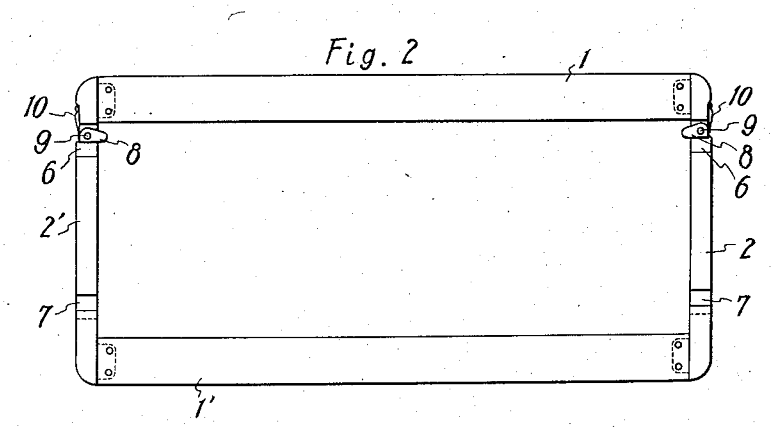
Figure 2 is a front view of the outer frame shown in Figure 1.
Figure 3:
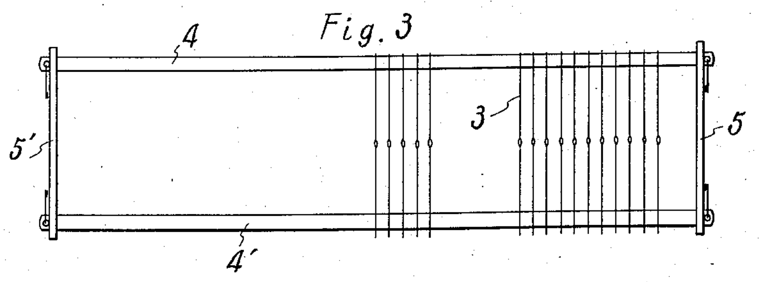
Figure 3 is a front view of the inner frame shown in Figure 1.
Figures 4, 5, 6, 7, 8, 9, 10, 11:
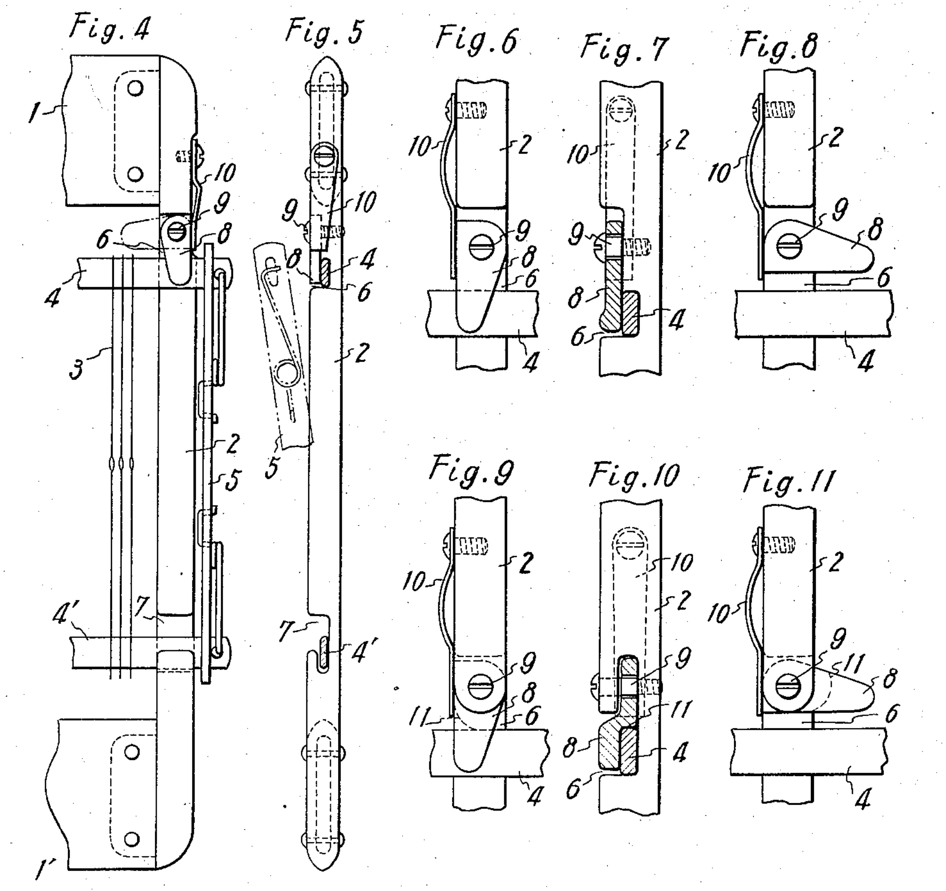
Figure 4 is an enlarged front view of the right side of the harness frame shown in Figure 1.
Figure 5 is a side elevation of Figure 4.
Figure 6 is an enlarged front view of the latching means on the end strut of the outer frame and holding the top heddle supporting bar of the inner frame.
Figure 7 is a vertical section of Figure 6.
Figure 8 is an enlarged front view of the latching means shown in Figure 6 for releasing the top heddle supporting bar of the inner frame.
Figure 9 is an enlarged front view of another example of the latching means, the lever of which is furnished with a cam holding the top heddle supporting bar of the inner frame.
Figure 10 is a vertical section of Figure 9.
Figure 11 is an enlarged front view of the latching means shown in Figure 9 for releasing the top heddle supporting bar of the inner frame.

In the harness frame of the present invention exemplified in these drawings, the outer frame consisting of top and bottom frame rails 1 and 1' and interconnected at either end by end struts 2 and 2', and the inner frame consisting either of top and bottom heddle supporting bars 4 and 4' for holding parallel heddles 3 or of top and bottom heddle supporting bars 4 and 4' and top and bottom frame rails 21 and 21', each of which is connected at either end by end struts 5 and 5'. The outer frame must be strong enough to sustain the entire load of the harness frame, and respective parts of the inner frame must be able to bear the respective loads of their own weights. The harness frame of the present invention shown in Figures 1 to 18 is furnished on the front side of each of the end struts 2 and 2' of the outer frame with upper notches 6 and lower notches 7 for holding respectively top heddle supporting bar 4 and bottom heddle supporting bar 4' of the inner frame. To install the inner frame within the outer frame, bottom heddle supporting bar 4' of the inner frame is first put into lower notches 7 of the outer frame, and then top heddle supporting bar 4 of said inner frame is pushed into upper notches 6 of said outer frame. With a view to holding the inner frame tightly within the outer frame, a lever 8 pivoted upon pivot 9 is attached to the upper front side of each of the end struts 2 and 2' of the outer frame and a metal plate spring 10 is attached to the outer side of each of the end struts of the outer frame adjacent the lever 8, thereby keeping said lever either horizontal or perpendicular as the case may be. In Figures 4 to 8 is shown an upper notch 6 which is just wide and deep enough to hold tightly therein top heddle supporting bar 4 of the inner frame when lever 8 is turned down over the front of said notch, and to release said bar when said lever is turned to the horizontal position, thereby making it possible to replace the inner frame easily. As a result of these devices, the possibility of causing any dislocation of the inner frame relative to the outer frame is eliminated, and the possibility of lever 8 moving by itself due to the mechanical shocks taking place during the course of the weaving operation is entirely removed by the metal plate spring 10. In Figures 9 to 11 is shown the mechanism for engaging the top heddle supporting bar 4 of the inner frame in the upper notches 6 by means of a cam 11 which is formed on the back of lever 8.

According to ordinary practice, it is almost impossible to replace the heddles, particularly when they are looped at both ends, without disengaging the harness frame itself. The heddle supporting bars in Figures 12 to 17, however, the U-shaped ones being shown in Figures 12 to 15 and the H-shaped ones being shown in Figures 16 and 17, are so formed as to strengthen the heddle supporting bar itself structurally and to set the heddles free to move along the entire length of the heddle supporting bar, thereby enabling the operator to replace the heddles when necessary without disengaging the harness frame itself and to handle the heddle supporting inner frame with ease as it is carrying a large number of heddles. Replacement of the heddles is performed either by pressing upon the free end of a metal plate spring 12, the other end of which is fixd to either end of the bottom side of U-shaped heddle supporting bar 4, with the head of a wire spring 13 attached to the inner side of each of the end struts 5 and 5' of the outer frame, as shown in Figure 15, or by turning an oblong rotatable piece 14 on each end of the H-shaped heddle supporting bar shown in Figures 16 and 17. Furthermore, the end struts of the inner frame are welded at either end to the heddle supporting bar as shown in Figures 15 to 17, to further strengthen said heddle supporting bar.

It is desirable to strengthen the end struts of the outer frame by leaving a part 15 uncut on one side of each of said end struts as illustrated in Figure 18 when the U-shaped and H-shaped heddle supporting bars shown in Figures 15 to 17 are employed for carrying a large number of heddles.

In order to apply the inner frame of the present invention to the ordinary harness frame hitherto frequently in use which is made of wooden frame rails and metal plate end struts a holder having a notch, a lever and a metal piece as a resilient means is attached to the upper corner of the inner side of each of the end struts, or to the bottom side of either end of the frame rail of the ordinary harness frame. Examples are given in Figures 19 to 24, in which lever 18 is free to move over the notch 17 in holder 16, and metal plate spring 19, the one end of which is fixed to holder 16, is employed to stop said lever in a horizontal or perpendicular position as the case may be. In Figures 19 and 20 is a partial showing of an embodiment of said mechanism including a holder 16 attached to the metal plate end struts 20 of the ordinary harness frame hitherto frequently in use and a lever 18 for holding the top heddle supporting bar 4 of the inner frame tightly within notches 17. In Figures 21 to 25 is shown a part of another embodiment of the invention holding the inner frame and consisting of top and bottom outer heddle supporting bars 21 and 21', inner top and bottom heddle supporting bars 4 and 4', each of which is connected at its ends with end struts made of metal. In this case, a holder 16 is attached to the bottom side of either end of the frame rail 22 of the harness frame to hold the top outer heddle supporting bar 21 of the inner frame tightly within notches 17 by means of levers 18.

The present invention is thus easily applicable to the ordinary harness frame hitherto frequently in use.

Needless to say, the above description of the present invention is also applicable to the double and triple harness frames. It is furthermore clear that the mechanism as described and illustrated with reference to Figures 21 to 25 is applicable to the heddle supporting inner frame consisting of top and bottom heddle supporting bars and end struts, each of which is interconnected in position at either end, and that the mechanism described and illustrated in connection with Figures 1 to 20 is also applicable to the heddle supporting inner frame consisting of top and bottom frame rails, top and bottom heddle supporting bars and end struts, each of said frame rails and heddle supporting bars being interconnected in position at either end with said end struts, in which instance the ends of the frame rails of the heddle carrying inner frame are received into the notches on the end struts of the outer frame.

I do not wish therefore to be understood as limiting the present invention to the exact form and combination of parts hereinbefore shown and described.

What I claim is:

1. A harness frame for looms comprising an outer frame to be permanently fixed to the loom which frame consists of top and bottom frame rails and outer frame end struts, each of said frame rails being connected at their ends by said outer frame end struts, an inner frame for carrying heddles which consists of at least one top and one bottom heddle supporting bars and inner frame end struts, each of said bars being connected at their end by said inner frame end struts, said outer frame having upper and lower notches therein and a lever and resilient means adjacent each notch in said outer frame, whereby the bottom heddle supporting bar is received in the lower notches and the top heddle supporting bar in the upper notches, and the heddle carrying inner frame is retained tightly within said outer frame and released therefrom by means of said levers and resilient means.

2. A harness frame for looms comprising an outer frame to be permanently fixed to the loom, which frame consists of top and bottom frame rails and outer frame end struts, each of said frame rails being connected at its ends to said outer frame end struts, an inner frame for carrying heddles which consists of top and bottom heddle supporting bars and inner frame end struts, each of said bars being connected at its ends to said inner end frame struts, each of said outer frame end struts having upper and lower notches therein, and a resilient means and a lever having a cam thereon on each of the outer end frame struts adjacent each of said notches, whereby the bottom heddle supporting bar is received in the lower notches and the top heddle supporting bar in the upper notches, and the heddle carrying inner frame is retained tightly within said outer frame and released therefrom by means of said resilient means and said levers with said cams thereon.

3. A harness frame for looms comprising an outer frame to be permanently fixed to the loom, which frame consists of top and bottom frame rails and outer frame end struts, each of said frame rails being connected at its ends to said outer frame end struts, an inner frame for carrying heddles which consists of top and bottom heddle supporting bars and inner frame end struts, each of said bars being connected at its ends to said inner end frame struts, each of said outer frame end struts having upper and lower notches therein, and a resilient means and a lever on each of the outer frame end struts adjacent each of said notches, whereby the bottom heddle supporting bar is received in the lower notches and the top heddle supporting bar in the upper notches, and the heddle carrying inner frame is retained tightly within said outer frame and released therefrom by means of said resilient means and said lever.

4. In a harness frame for looms having top and bottom frame rails and end struts, each of said frame rails being connected at their ends to said end struts, the improvement comprising means for fixing said frame to the loom, a heddle supporting frame consisting of top and bottom heddle supporting bars and supporting frame end struts, each of said bars being connected at their ends to said supporting frame end struts, resilient means and a heddle supporting frame supporting member having a notch therein and a lever thereon, said resilient means and supporting member being attached to the frame fixed to the loom adjacent each end of the top heddle supporting bar, whereby the top heddle supporting bar may be received in said notch and the heddle carrying frame is retained tightly within the frame fixed to the loom and released therefrom by means of said lever and resilient means.

5. A harness frame for looms comprising an outer frame to be permanently fixed to the loom and which consists of top and bottom frame rails and outer frame end struts, each of said frame rails being connected at their ends with said outer frame end struts, an inner frame for carrying heddles which consists of outer top and bottom heddle supporting bars, inner top and bottom heddle supporting bars and inner frame end struts, each of said heddle supporting bars being connected at their ends to said inner frame end struts, said outer frame end struts each having upper and lower notches therein, and a lever and resilient means on each of the outer frame end struts adjacent each of said notches, whereby the outer bottom heddle supporting bar on the inner frame is received in the lower notches and the outer top heddle supporting bar on the inner frame in the upper notch, and the heddle carrying inner frame is retained tightly within the outer frame and released therefrom by means of said levers and resilient means.

6. A harness frame for looms comprising an outer frame to be permanently fixed to the loom and which consists of top and bottom frame rails and outer frame end struts, each of said frame rails being connected at their ends with said outer frame end struts, an inner frame for carrying heddles which consists of outer top and bottom heddles supporting bars, inner top and bottom heddle supporting bars and inner frame end struts, each of said heddle supporting bars being connected at their ends to said inner frame end struts, said outer frame end struts each having upper and lower notches therein, and a resilient means and a cam having a lever thereon on each of the outer frame end struts adjacent each of said notches, whereby the outer bottom heddle supporting bar of the inner frame is received in the lower notches and the outer top heddle supporting bar of the inner frame in the upper notch, and the heddle supporting inner frame is retained tightly within the outer frame and released therefrom by means of said resilient means and said cam having a lever.

7. In a harness frame for looms having top and bottom frame rails and end struts, each of said frame rails being connected at their ends to said end struts, the improvement comprising means for permanently fixing said frame to the loom, a heddle supporting frame consisting of outer top and bottom heddle supporting bars, inner top and bottom heddle supporting bars and heddle supporting frame end struts, each of said heddle supporting bars being connected at their ends to said heddle supporting frame end struts, and means for removably mounting said heddle supporting frame while it is carrying heddles which includes resilient means and heddle supporting frame supporting members having a notch therein and a lever thereon, said resilient means and a supporting member being attached to the harness frame permanently fixed to the loom adjacent either end of the outer top heddle supporting bar of the inner frame for receiving the outer top heddle supporting bar of the inner frame in said notch whereby the heddle carrying frame is retained tightly within the frame permanently fixed to the loom and may be released therefrom by means of said lever and resilient means.

References Cited in the file of this patent

UNITED STATES PATENTS 2,556,468 Consoletti ------------- June 12, 1951